Dec. 9, 1941.   V. DAVID   2,265,355
METHOD OF PROVIDING ORIGINAL LIGHT EFFECTS
BY A MECHANICAL ADVERTISING DEVICE
Filed Aug. 19, 1938   2 Sheets-Sheet 1

Inventor
Victor David
By Albert E. Dieterich
Theodore H. Rutley
Attorneys

Patented Dec. 9, 1941

2,265,355

UNITED STATES PATENT OFFICE 2,265,355

METHOD OF PROVIDING ORIGINAL LIGHT EFFECTS BY A MECHANICAL ADVERTISING DEVICE

Victor David, Vancouver, British Columbia, Canada

Application August 19, 1938, Serial No. 225,832

3 Claims. (Cl. 40—132)

This invention relates to improvements in mechanical advertising devices designed to create animation and to simulate the movement of sunlight and water when suitable still scenes are used in conjunction with the device.

My invention is also designed to provide a series of varying light effects upon static displays of advertising matter in which the displays are seemingly within a field of breathing, billowing light effects of changing colors which provide an interesting and arresting presentation of advertising matter.

These effects are produced by means of glass screens placed one behind the other in a cabinet having a window through which the front screen is visible, and arranging the front screen as a stationary one and the rear screen as a vibrating one, a light source being positioned behind the rear screen, which light source may be reciprocable back and forth from and toward the back screen, the glass of the screens being corrugated glass, such as is known as hammered glass, cathedral glass, muranese, etc., preferably having the irregularities on one face (clear glass or frosted glass being excluded).

One or more additional glass screens may be placed between the stationary front screen and the vibrating back screen if desired.

My invention is designed to create new color effects of an iridescent, billowing and animated character that are both original and striking and give to the advertising matter being displayed an instant appeal and interest.

One of the objects of my invention is to provide an advertising display of an illuminated character, having original, effective and alluring light effects of animated form, that is adapted to be arresting in character and form in both day and night displays.

A further object of my invention is to create, in a simple and inexpensive form, an advertising display of the character described, and having means for changing the light effects therein with the minimum of effort and expense.

A still further object of my invention is to provide an advertising device that permits of the ready changing of both the advertising matter and the light effects, either by the use of ordinary electric lights alone or in combination with neon tubes, singly or conjointly, as desired.

My invention, and the nature of same, will be more readily understood by reference to the following detailed specification and accompanying drawings forming part of this application, and in which.

Figure 1:
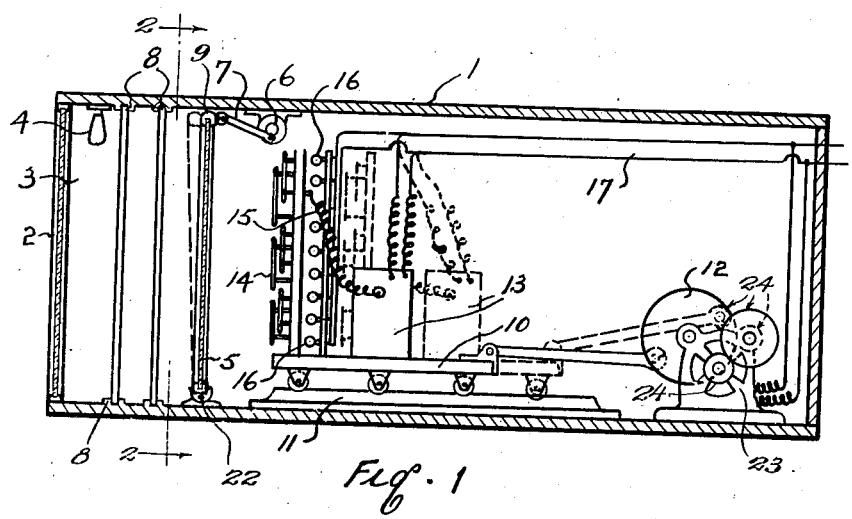
Figure 1 is a diagrammatic longitudinal sectional view of the advertising device.

In the drawings, in which like numerals of reference indicate like parts in all figures, 1 represents the cabinet (shown in longitudinal section). This cabinet has a window in its front which is provided with a glass screen 2 formed of so-called corrugated glass, on which glass advertising matter $2^x$ (Fig. 6) may be directly painted or may be located in cooperative relation to the screen 2 by means of a transparency (Fig. 5) placed against the glass in front of the screen.

To the rear of the screen 2 is a compartment 3 in which are guides or slideways 8 for the reception of auxiliary glass screens if desired.

The back of the compartment 3 is formed by a vibrating screen 5 also of so-called corrugated glass. The frame 9 of the screen 5 may be pivoted at 22 along one edge (Fig. 1) and be vibrated by means of electric motor 6 having a crank and connecting rod connection 7 with the frame of the screen 5, or it may be constructed as shown in either Figs. 2, 3 or 4, of which more will be said later.

The compartment 3 may be provided, if desired, with an independent illuminant 4; the principal illumination, however, is obtained from a relatively strong light source or sources (neon tubes 14 and/or incandescent lamps 16) placed to the rear of the back vibrating screen 5.

Preferably the main light source (14 and/or 16) is mounted on a carriage 10 which is mounted to travel, back and forth from and toward the screen 5, on a track 11. The usual transformer 13 and light changing or "flasher" devices used in the art may, and preferably are mounted on the carriage 10, but as these elements are well known and conventional and, per se, are not of my invention a detailed description and illustration thereof are thought to be unnecessary here.

15 designates the wires connecting the light sources 14 and 16 with the respective transformer and flasher elements 13.

The carriage is reciprocated, i. e., moved back and forth while the apparatus is in operation, by any suitable means as, for example, an electric motor 23 which operates a crank and connecting rod arrangement 12 through a suitable reduction gear train 24, diagrammatically shown in Fig. 1.

So far as described, when current is passed into the apparatus via wires 17 the motors 6 and 23 are energized and the screen 5 is given a rapid vibratory motion. This rapid vibration of the rear screen 5 while the front screen 2 is held stationary produces a very brilliant and glittering effect as the light is projected through the screens 5 and 2 from the rear light source (14 and/or 16) and some of the light is reflected and diverted by the bulges on the opposed faces of the screens 2 and 5 before it finally passes through the front screen 2.

When the rear light source is nearest the screen 5, it is obvious that the scintillating light viewed at the front window of the cabinet is brightest and of greatest intensity and the shape of the light is distinguishable; when the carriage is at the extreme backward limit of its stroke the intensity of the illumination at the front window is the least, but covers the greatest area and the light source becomes indistinguishable. This movement of the carriage-carried light source or sources gives a billowing and breathing effect, which, when added to the scintillating effect produced by the vibrating screen, gives a combined effect of a very pleasing nature, that can obviously be varied between wide limits simply by varying the speeds of the motors 6 and 23.

Figures 2, 3:
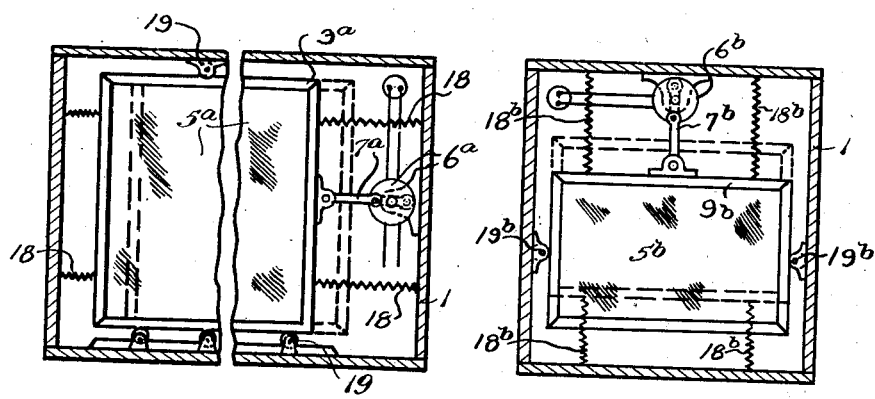
Fig. 2 is a section on the line 2—2 of Fig. 1, showing a modification of the invention.
Fig. 3 is a section on the line 2—2 of Fig. 1, showing another modification of the invention.
Figure 4:
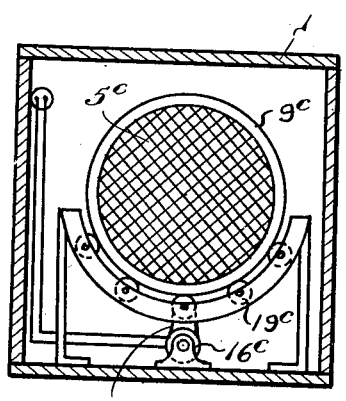
Fig. 4 is a section on the line 2—2 of Fig. 1, showing a third modification of the invention.

Instead of the pivoted or hinged type of construction for the rear screen 5, the rear screen may be arranged as shown in either Figs. 2, 3 or 4.

By reference to Fig. 2 it will be seen that the screen 5ª has its frame 9ª mounted to reciprocate crosswise between upper and lower roller guides 19, the motor 6ª and crank and connecting rod device 7ª being mounted on a side of the cabinet instead of the top, as in Fig. 1. Balance springs 18 are provided between the frame 9 and cabinet 1 which tend to center the frame and quiet the action of the moving parts.

In Fig. 3 is shown substantially the same arrangement as in Fig. 2 save that it is turned 90°. That is to say, the frame 9ᵇ is mounted between side guide rollers 19ᵇ and is given a vertical movement by the motor 6ᵇ and connections 7ᵇ and the quieting springs 18ᵇ connect the frame 9ᵇ with the top and bottom walls of the cabinet 1.

In Fig. 4 the frame 9ᶜ of screen 5ᶜ is circular and is mounted for oscillation on a series of circularly arranged rollers 19ᶜ. Oscillations about the center of the screen 5ᶜ is produced by motor 16 and a suitable connection 25.

Figure 5:
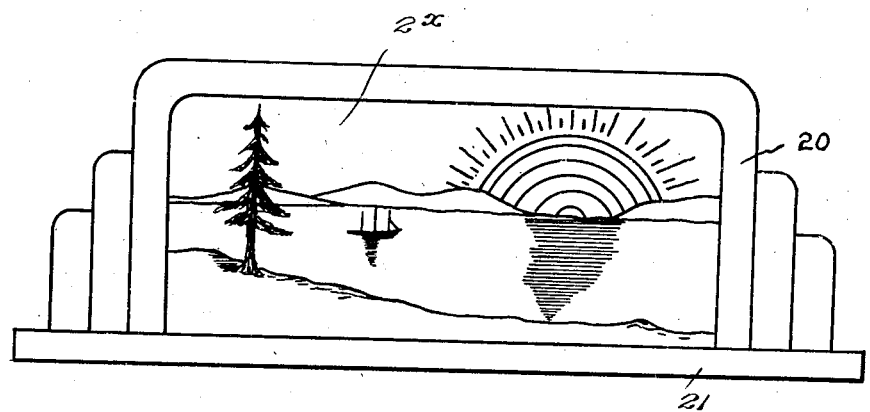
Fig. 5 is a front elevation of an ornamental frame for a picture transparency which may be set in front of the window of the cabinet and through which the light from the cabinet passes.
Figure 6:
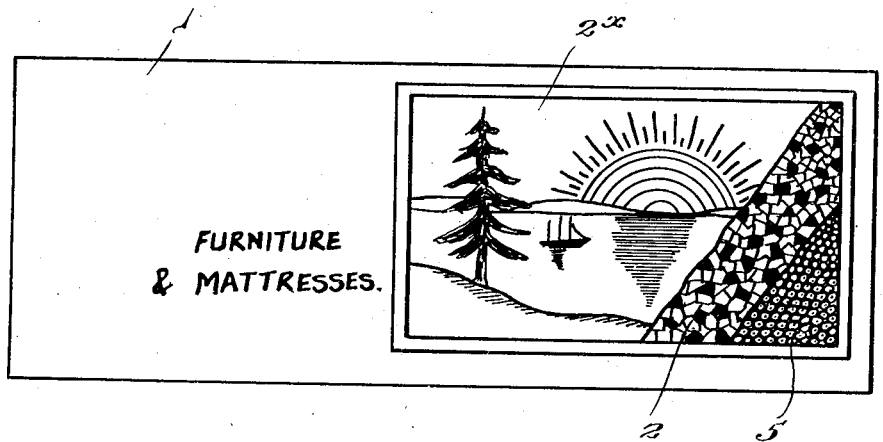
Fig. 6 is a front view of the cabinet, showing the scene placed directly on the stationary front glass window screen.

In Fig. 5, 20 designates a flat frame, having a base strip 21, in which frame a transparency having display matter 2ʸ thereon is carried. This unit may be placed directly in front of the window of the cabinet 1, as before intimated, instead of painting the display directly on the screen 2.

If desired, a part of the display matter may be applied to the screen 2 and the remainder to an auxiliary screen when placed in one of the slideways 8. When this arrangement is provided, quite a different effect can be produced from that which takes place when the whole display is painted on screen 2; with part of the picture on an auxiliary or intermediate screen, a more complete fadeout effect is produced as to that part of the picture which is not on screen 2. Other effects can be produced by the use of the light 4 in compartment 3 when desired. Other modifications of the use of the apparatus will readily occur to those skilled in the art.

The preferred forms and types of corrugated glass used in my device, which I have found suitable for setting up effects of magnification, are designated by the manufacturers as follows:

White Sparkle, Hammered No. 2 and No. 3, Large Hammered, Chipped, White Arctic, Flemish, Holt, Fine Hammered, Figure G., Cathedral, Muranese and Dark Surface.

From the above list of glasses, careful selection is made in conformity with the display to be shown, in order to obtain the highest effects of magnification and light.

Having now described my invention and the nature of same, what I claim and desire to be protected in, by Letters Patent, is:

1. An advertising device comprising in combination, a cabinet closed save for a window, a front corrugated glass screen visible through the window, another corrugated glass screen located behind the first corrugated glass screen, a light source behind said another corrugated glass screen, means for vibrating one of said corrugated glass screens, and means for effecting a back and forth movement of the light source from and toward said corrugated glass screens.

2. An advertising device comprising in combination, a cabinet closed save for a window, a front corrugated glass screen visible through the window, another corrugated glass screen located behind the first corrugated glass screen, a light source behind said another corrugated glass screen, means for vibrating one of said corrugated glass screens, a carriage on which said light source is mounted, and means for imparting to said carriage a back and forth movement from and toward said screens while said vibrating screen is being vibrated.

3. An advertising device comprising in combination, a cabinet closed save for a window, a stationary front corrugated glass screen visible through the window, a second corrugated glass screen located behind the first corrugated glass screen, a light source behind the second corrugated glass screen, means for vibrating the second corrugated glass screen, a carriage on which said light source is mounted, and means for imparting to said carriage a back and forth movement from and toward said screens while said vibrating screen is being vibrated.

VICTOR DAVID.